United States Patent [19]

Dunn

[11] 4,433,420

[45] Feb. 21, 1984

[54] METHOD AND APPARATUS FOR DETERMINING THE LEVEL OF SLAG CONTAINING IRON OR IRON COMPOUNDS IN A GLASS MELTING FURNACE

[75] Inventor: Charles S. Dunn, Pataskala, Ohio

[73] Assignee: Owens-Corning Fiberglas Corporation, Toledo, Ohio

[21] Appl. No.: 376,812

[22] Filed: May 10, 1982

[51] Int. Cl.³ .................. C03B 5/027; F27D 21/04
[52] U.S. Cl. ................................ 373/39; 65/160; 340/620
[58] Field of Search .............. 65/160, 161, 162, 168; 340/618, 620; 373/39, 40, 33, 35, 29

[56] References Cited

U.S. PATENT DOCUMENTS

| | | | |
|---|---|---|---|
| 1,961,893 | 6/1934 | Wadman et al. | 49/54 |
| 3,984,611 | 10/1976 | Varrasso | 373/40 |
| 4,063,027 | 12/1977 | Varrasso et al. | 13/6 |
| 4,075,414 | 2/1978 | Thomas | 13/13 |
| 4,194,078 | 3/1980 | Thomas | 13/9 |
| 4,312,657 | 1/1982 | Canfield et al. | 65/160 X |

*Primary Examiner*—Roy N. Envall, Jr.
*Attorney, Agent, or Firm*—Ronald C. Hudgens; Patrick P. Pacella; Ronald C. Champion

[57] ABSTRACT

A method and apparatus for determining the level of slag containing iron or iron compounds in the bottom of a glass melting furnace is disclosed. Electrically conductive electrodes or probes are placed in a predetermined position in the furnace. When the iron containing slag touches the electrodes or probes, the resistance between the electrodes or probes decreases or the current flowing between them increases activating a signal or alarm to warn the operator of the level of the slag in the furnace.

13 Claims, 6 Drawing Figures

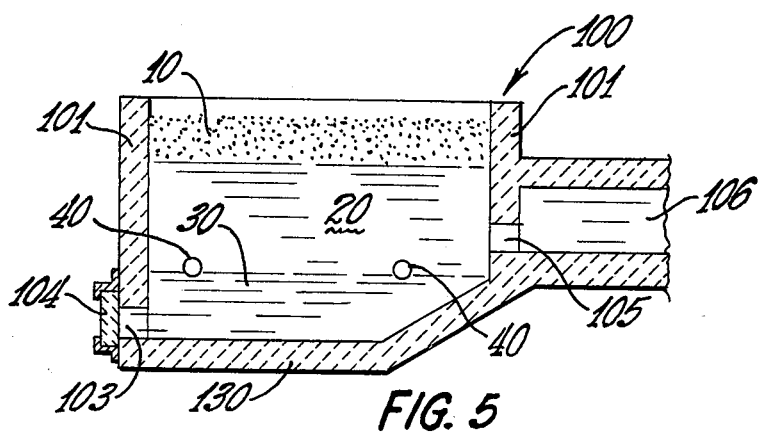
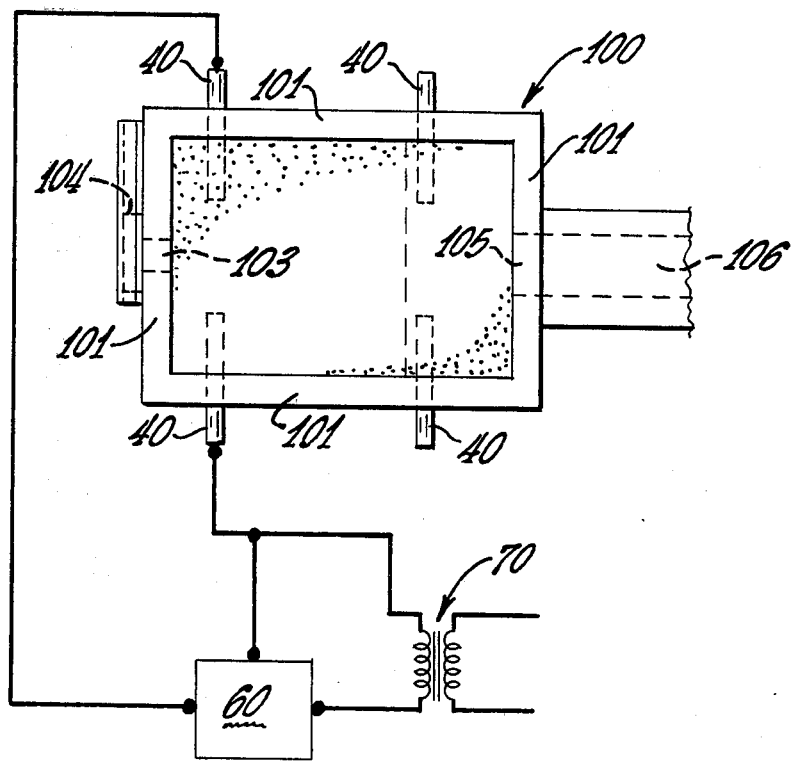

METHOD AND APPARATUS FOR DETERMINING THE LEVEL OF SLAG CONTAINING IRON OR IRON COMPOUNDS IN A GLASS MELTING FURNACE

TECHNICAL FIELD

This invention relates to the glass melting arts and particularly to melting compositions having a high iron content.

BACKGROUND ART

A search is constantly being made for less expensive raw materials to be used in producing glass. Naturally occurring materials, such as basalt and some shales, can be used to produce glass. These naturally occurring materials, however, contain iron oxides. During melting, some of this iron oxide is reduced and a slag containing iron and iron compounds is produced. This slag material is denser than the molten glass and tends to accumulate in the bottom of the glass furnace enclosure. This slag containing iron and iron compounds tends to contaminate and rapidly degrade not only the molybdenum used for electrodes, but also the platinum used for heater strips, bushings and thermocouple probes. Should the level of the slag containing iron and iron compounds accumulate sufficiently to flow into the forehearth of the furnace, extensive damage can be done to the platinum bushings used in fiber forming and to fiberizers used in the glass wool making process. This invention discloses a method and apparatus for determining when the slag containing iron and iron compound reaches the level where corrective action must be taken.

Molten glass is electrically conductive but presents a high resistance to the flow of electrical current. This principle was used by Wadham et al., U.S. Pat. No. 1,961,893, to determine the level of molten glass in a forehearth by inserting electrodes at varying heights in the molten glass. If a given electrode was conducting electricity, then it was positioned in the molten glass. If the electrode was not conducting electricity, then it was positioned above the molten glass. Varrasso et al., U.S. Pat. No. 4,063,027, measured the resistance between electrodes in a glass melting furnace to determine if the electrodes had slumped, shifted or broken. Varrasso et al. were detecting when the resistance between the electrodes increased as an indication of problems with the electrode positions.

Slag containing iron or iron compounds is highly electrically conductive. When the slag contacts the electrical conductive elements, the resistance between the electrically conductive elements drops. This drop in resistance indicates that the slag has accumulated to the level of the conductive elements.

DISCLOSURE OF INVENTION

A furnace enclosure is provided with sidewalls and a bottom wall. The bottom wall forms a recess in which slag containing iron or iron compounds may accumulate due to their density being greater than the density of the molten glass. Electrically conductive elements such as electrodes or probes are placed into the furnace enclosure either through the bottom wall, sidewalls, or into the top of the furnace such that they are positioned to contact the slag when the slag reaches a predetermined level. The level at which the slag is to be detected is selected to prevent the slag from flowing into the forehearth and to prevent damages to other metallic elements in the furnace enclosure such as molybdenum electrodes or platinum probes.

When heating electrodes are used as the electrically conductive device, the voltage across and the current flowing between electrode pairs can be measured. The resistance between the electrodes can be determined by the well known equation $R = E/I$, where $R$ = resistance, $E$ = voltage, and $I$ = current flow. The normal resistance between the electrodes is dependent upon the voltage applied to the electrodes, the spacing between the electrodes or the length of the path through the molten glass, and the resistance of the molten glass. The resistance of the slag containing iron and iron compounds is so low compared to the molten glass that the resistance between electrodes which are immersed in the slag is almost zero. Heating electrodes are energized through a transformer circuit and the voltage remains nearly constant. The rapid decrease in resistance is accompanied by a rapid increase in current flow. Since resistance and current flow are inversely proportional, either a drop in resistance or an increase in current flow can be used to determined when the slag has reached the level of the electrodes.

Conductive probes, such as platinum rods or platinum thermocouple sheaths, may be used in place of the electrodes to determine the level of the slag containing iron or iron compounds. A voltage is impressed on pairs of these probes and the current flow between the probes is measured. The resistance between the probes is then determined in a manner similar to that used in the case of heating electrodes. The threshold level of resistance change is then used to determine the slag level.

The resistance decrease or current increase as detected by the electrodes or probes is used to alert the operator of the level of the slag in the furnace enclosure. An alarm is sounded or indicator lights actuated to warn the operator that the slag level has reached a level where corrective action must be taken. The furnace may be shut down, allowed to cool and the slag removed in a conventional mechanical manner, or the slag may be removed in a liquid form by ports positioned in either the bottom or sidewalls of the furnace enclosure.

Other objectives, advantages and applications of the present invention will be made apparent by the following detailed description of the preferred embodiments of the invention.

BRIEF DESCRIPTION OF THE DRAWINGS

FIG. 5 is a cross section of a furnace enclosure having a bottom wall, one side of which is downward sloping, with a drain port positioned in the sidewall and horizontal electrodes.

FIG. 6 is a top view of the furnace enclosure and electrodes of FIG. 5.

BEST MODE FOR CARRYING OUT THE INVENTION

Figure 1:
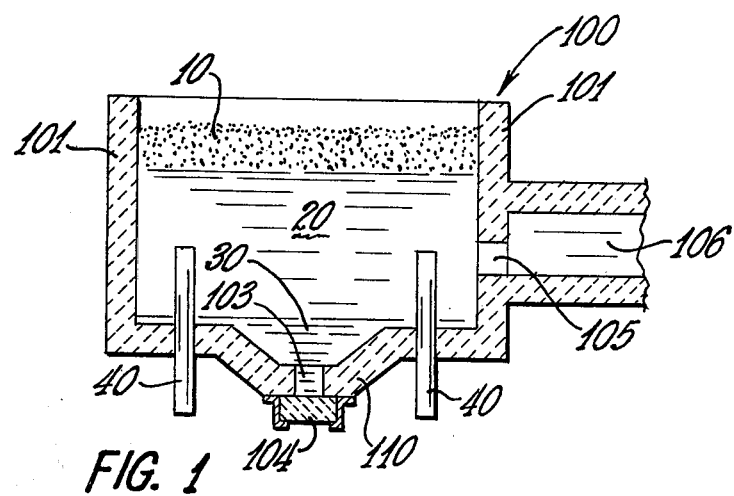
FIG. 1 is a cross section of a furnace enclosure showing a bottom wall having a downward sloping central recess with a drain port and bottom entering electrodes.
Figure 2:
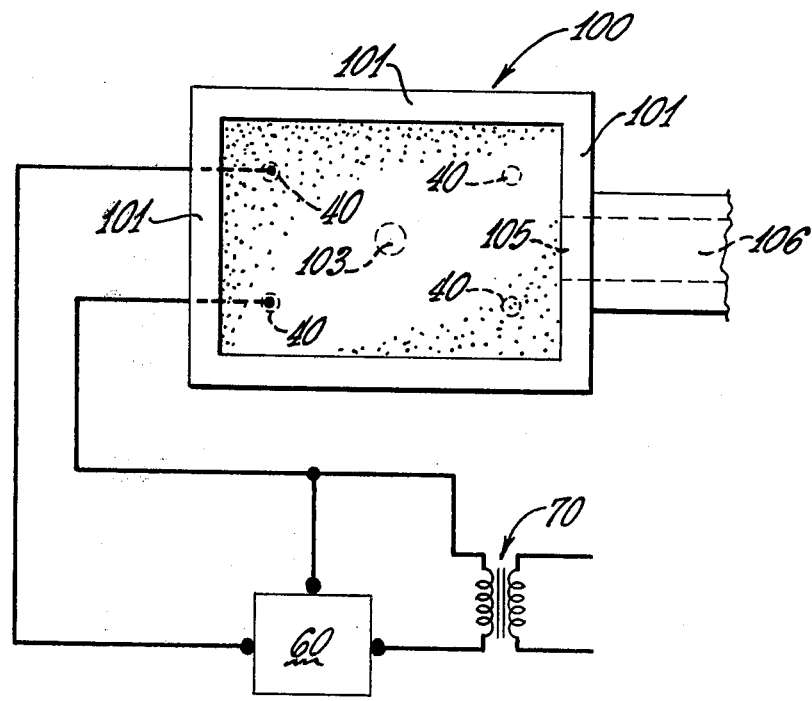
FIG. 2 is a top view of the furnace enclosure and electrodes of FIG. 1.
Figure 3:
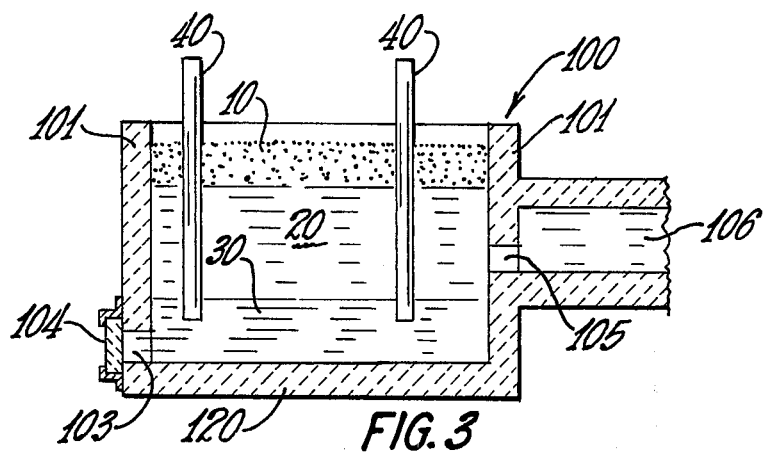
FIG. 3 is a cross section of a furnace enclosure having a substantially flat bottom wall with a sidewall located drain port and top entering electrodes.
Figure 4:
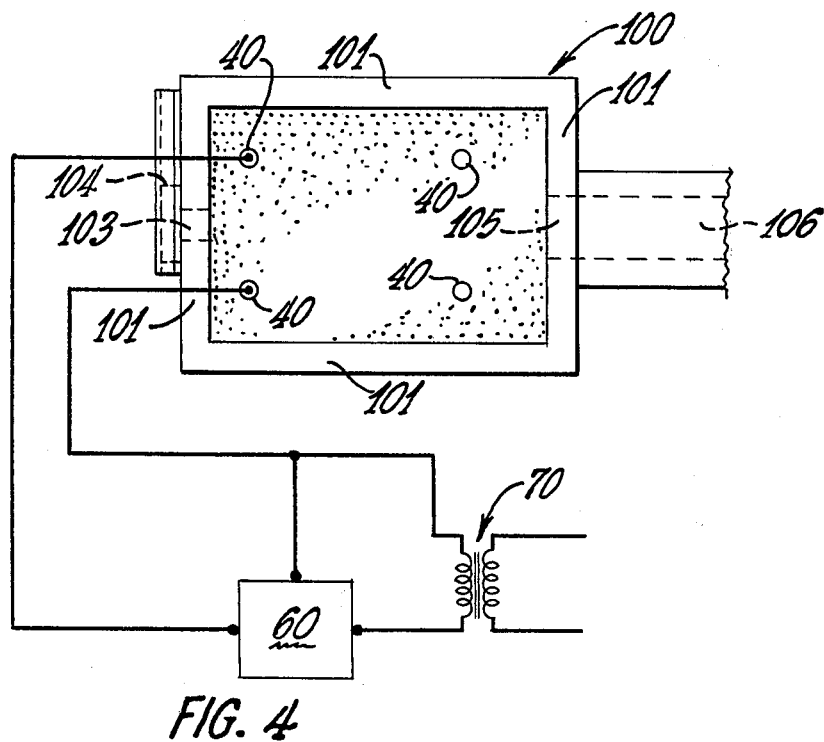
FIG. 4 is a top view of the furnace enclosure and electrodes of FIG. 3.

A glass furnace enclosure 100 as shown in FIG. 1 is provided with substantially vertical sidewalls 101 and a bottom wall 110 and contains unmelted particulate batch material 10, molten glass 20 and slag 30 containing iron and iron compounds. A drain portion 103 is provided in the bottom wall 110 as shown in FIG. 1 or in the sidewall 101 as shown in FIG. 3 or FIG. 5. Port 103 is blocked by a slidable block 104. Electrically conductive elements 40 protrude through the bottom wall 110 as shown in FIG. 1 or the sidewall 101 as shown in FIG. 5 or through the top of the furnace through the particulate batch material 10 into the molten glass 20 as shown in FIG. 3. The electrically conductive elements 40 are positioned such that their lowest position in the furnace enclosure 100 is the highest position that the slag 30 is to accumulate prior to warning the operator. In order to provide a recess or reservoir in the bottom of the furnace enclosure 100 to accumulate the slag 30, the bottom wall may need to be centrally downward sloping such as bottom wall 100 in FIG. 1, substantially horizontal as bottom wall 120 in FIG. 3, or merely downwardly sloping toward one sidewall 101 as described by bottom wall 130 in FIG. 5.

The electrically conductive elements 40 are provided with a monitor and alarm circuit 60 which is similar to the circuit disclosed by Varrasso et al. in U.S. Pat. No. 4,063,027. Notwithstanding the circuitry disclosed by Varrasso et al., the monitor and alarm circuit may be as simple as a current monitor connected to a limit switch (not shown) and an indicator lamp (not shown) which is activated when the current flow exceeds a predetermined limit. A device 70, such as a transformer, provides power to the conductive element when the conductive element 40 is an electrode or produces a reference voltage when the conductive element 40 is a probe.

In the preferred embodiment of this invention, a furnace enclosure 100 consisting of substantially vertical sidewalls 101 and a substantially horizontal bottom wall 120 is provided with a port 103 in one of the sidewalls 101 for withdrawing slag 30 containing iron or iron compounds which has accumulated in the bottom of the furnace. A second port 105 on the opposite side of the furnace positioned substantially above the bottom wall 120 leads to the forehearth 106. Molybdenum electrodes 40 protrude through the top of the furnace enclosure through the unmelted particulate batch material 10 into the molten glass 20 to a level at which the slag 30 is to be detected. These electrodes 40 may be adjustable in the vertical plane to compensate for various depths of slag detection and to compensate for wear and erosion of the electrodes 40. The electrodes 40 are fed electrical power by means of a step-down transformer 70. A monitor and alarm circuit 60 is provided which monitors the voltage across the electrodes 40 and the current flowing between the electrodes 40. The resistance is measured by the equation $R = E/I$ as described above. When this measurement falls to substantially zero caused by the ferrosilicon slag 30 contacting the electrode 40, an audible alarm is sounded to warn the operator of the level of the slag in the furnace. The block 104 covering the drain port 103 is removed and the slag 30 which has solidified in the port 103 is liquified by means of an oxygen lance. After the slag 30 has been substantially withdrawn, the refractory block 104 is repositioned over the port 103 to stop the flow of the material from the furnace.

INDUSTRIAL APPLICABILITY

In glass making, naturally occurring minerals are softened by heat to form glassy material. The search for lower cost raw materials has lead to basalt and certain shale materials. These materials, however, have a high iron oxide content. The iron oxides are reduced in the melting process to a slag consisting of iron and iron compounds. This ferrosilicon slag attacks and degrades materials used in the melting such as molybdenum used in electrodes and spinners and platinum used as thermocouples, thermocouple sheaths, heater strips and bushings. The slag developed by these iron compounds is denser than the molten glass and tends to accumulate in the lower part of the melting chamber. By means of the current invention, the operator is warned when the slag level accumulates to a point where it could start causing damage to the furnace elements. Corrective action, such as draining the slag, can be accomplished so that the process can continue without damage to expensive elements of the furnace.

In describing the invention, certain embodiments have been used to illustrate the invention. However, the invention is not limited to these specific embodiments, as other embodiments and modifications within the spirit of the invention will readily occur to those skilled in the art on reading this specification. The invention is, thus, not intended to be limited to the specific embodiments disclosed but instead is to be limited only by the claims appended hereto in light of the disclosure above.

I claim:

1. An apparatus for determining the level of slag containing iron and iron compounds in a glass melting furnace comprising:
   a furnace enclosure having sidewalls and a bottom wall;
   electrically conductive elements protruding through the walls of the furnace enclosure above the lowest level of the bottom wall at a level at which the slag is to be detected;
   a means for determining the change in resistance between pairs of the electrically conductive elements; and
   a means responsive to the change in resistance to activate an audible alarm to initiate the draining of the slag.

2. An apparatus for determining the level of slag containing iron or iron compounds in a glass melting furnace as recited in claim 1, wherein the electrically conductive elements are Joule-heating electrodes.

3. An apparatus for determining the level of slag containing iron or iron compounds in a glass melting furnace as recited in claim 2, wherein the electrically conductive elements are molybdenum electrodes.

4. An apparatus for determining the level of slag containing iron or iron compounds in a glass melting furnace as recited in claim 1, wherein the electrically conductive elements are platinum probes.

5. An apparatus for determining the level of slag containing iron or iron compounds in a glass melting furnace comprising:
   a furnace enclosure constructed of refractory material having substantially vertical sidewalls and a bottom wall forming a recess in the bottom of the furnace enclosure;

electrically conductive elements positioned in the furnace enclosure walls in pairs above the bottom most portion of the furnace enclosure at a level at which the slag is to be detected;

a means to determine the drop in resistance between the electrically conductive element pairs; and a means responsive to the drop in resistance measured between the electrically conductive element pairs to drain the slag when the slag level reaches the level of the electrically conductive element pairs.

6. An apparatus for determining the level of slag containing iron and iron compounds in a glass melting furnace as recited in claim 5 wherein the electrically conductive elements are molybdenum electrodes.

7. An apparatus for determining the level of slag containing iron and iron compounds in a glass melting furnace as recited in claim 5 wherein the electrically conductive elements are platinum probes.

8. An apparatus for determining the level of slag containing iron and iron compounds in a glass melting furnace comprising:

(a) a furnace enclosure constructed of refractory material having substantially vertical sidewalls and a bottom wall;

(b) a pair of electrically conductive elements protruding into the interior of the furnace enclosure to a point at which the slag is to be detected;

(c) a means for determining a change in the current flowing between the pair of electrically conductive elements; and (d) a means associated with the change in the current flowing between the pair of electrically conductive elements for initiating the removal of the slag from the furnace enclosure.

9. An apparatus for determining the level of slag containing iron and iron compounds in a glass melting furnace as recited in claim 8 wherein the pair of electrically conductive elements are vertically adjustable molybdenum electrodes.

10. A method for controlling the level of slag containing iron or iron compounds in a glass melting furnace comprising the steps of:

positioning electrically conductive elements through the walls of a glass melting furnace enclosure such that the electrically conductive elements penetrate the interior of the furnace enclosure at an elevation at which the slag is to be detected;

measuring the change in resistance between the electrically conductive elements; and draining the slag from the furnace enclosure in response to the change in resistance.

11. A method of determining the level of slag containing iron or iron compounds in a glass melting furnace as recited in claim 10, wherein the electrically conductive elements are molybdenum electrodes.

12. A method of determining the level of slag containing iron or iron compounds in a glass melting furnace as recited in claim 10, wherein the electrically conductive elements are platinum probes.

13. A method of determining the level of slag containing iron or iron compounds in a glass melting furnace comprising the steps of:

positioning molybdenum electrodes through the walls of a glass melting furnace such that the electrodes protrude into the interior of the furnace at a level at which the slag is to be detected;

measuring the current flow between pairs of electrodes; and draining the accumulated slag from the furnace enclosure when the current flow increases to a predetermined level.

* * * * *